United States Patent
Yang

(10) Patent No.: US 8,330,400 B2
(45) Date of Patent: *Dec. 11, 2012

(54) ELECTRIC MOTOR DRIVE SYSTEM WITH BI-DIRECTIONAL INPUT AND CONSTANT DIRECTIONAL OUTPUT

(76) Inventor: Tai-Her Yang, Dzan-Hwa (TW)

( * ) Notice: Subject to any disclaimer, the term of this patent is extended or adjusted under 35 U.S.C. 154(b) by 458 days.

This patent is subject to a terminal disclaimer.

(21) Appl. No.: 12/382,380

(22) Filed: Mar. 16, 2009

(65) Prior Publication Data

US 2010/0090550 A1    Apr. 15, 2010

Related U.S. Application Data

(63) Continuation-in-part of application No. 12/285,588, filed on Oct. 9, 2008.

(51) Int. Cl.
*H02P 6/00* (2006.01)
(52) U.S. Cl. .................. 318/400.01; 318/400.07
(58) Field of Classification Search .......... 318/400.01, 318/400.07, 432, 434, 139, 727
See application file for complete search history.

(56) References Cited

U.S. PATENT DOCUMENTS

| | | | | |
|---|---|---|---|---|
| 4,419,610 A | * | 12/1983 | Pollman | 318/12 |
| 5,489,003 A | * | 2/1996 | Ohyama et al. | 180/65.6 |
| 5,841,201 A | * | 11/1998 | Tabata et al. | 290/40 C |
| 5,970,822 A | * | 10/1999 | Jung et al. | 74/810.1 |
| 7,156,780 B1 | * | 1/2007 | Fuchs et al. | 482/92 |
| 7,352,143 B2 | * | 4/2008 | Inaba et al. | 318/139 |
| 7,617,896 B2 | * | 11/2009 | Ogata | 180/65.7 |

* cited by examiner

*Primary Examiner* — Rina Duda
(74) *Attorney, Agent, or Firm* — Bacon & Thomas, PLLC

(57) ABSTRACT

The present invention discloses a system having a particular electric motor being able to do bi-directional rotational input having its output ends for providing output to the input ends of the constant directional output transmission device, while the constant rotational directional output is used to drive the loading wheel train via the output end of the constant directional output transmission device, wherein the user can operatively control the rotational direction of driving inputs, thereby the constant rotational output of different speed change ratio in different directions of driving inputs can be made via the constant directional output transmission device of different speed change ratios.

17 Claims, 4 Drawing Sheets

US 8,330,400 B2

ELECTRIC MOTOR DRIVE SYSTEM WITH BI-DIRECTIONAL INPUT AND CONSTANT DIRECTIONAL OUTPUT

This application is a Continuation-in-Part of nonprovisional application Ser. No. 12/285,588, filed Oct. 9, 2008.

BACKGROUND OF THE INVENTION (a) Field of the Invention

The present invention discloses an electric motor being able to be driven by electric power from the power source through the electric motor operative control device to do bi-directional rotation of positive or reverse rotation for driving the input end of the constant directional output transmission device and further through the output end of the constant directional output transmission device to provide constant directional rotation output of different speed change ratio in different directions of driving inputs via the constant directional output transmission device with different speed change ratio for driving the loading wheel trains; wherein the present invention can be applied in electric motor driven carriers such as electric bicycles, electric motorcycles, electric vehicles, or electric driven industry machinery.

(b) Description of the Prior Art

For the speed change output of the conventional electric motor drive system, except for controlling the electric motor to change speed, it usually has to be achieved by CVT or gear shift, which has drawbacks of complicated structures, high costs and low transmission efficiency.

SUMMARY OF THE INVENTION

The present invention discloses an electric motor drive system having a particular electric motor being able to do bi-directional rotational input having its output ends for providing output to the input ends of the constant directional output transmission device, while the constant rotational directional output is used to drive a loading wheel via the output end of the constant directional output transmission device, wherein the user can operatively control the rotational direction of the electric motor so as to change the driving input directions, thereby the constant rotational output of different speed change ratio in different directions of driving inputs can be made via the constant directional output transmission device having different speed change ratios.

DESCRIPTION OF MAIN COMPONENT SYMBOLS

Figure 1:
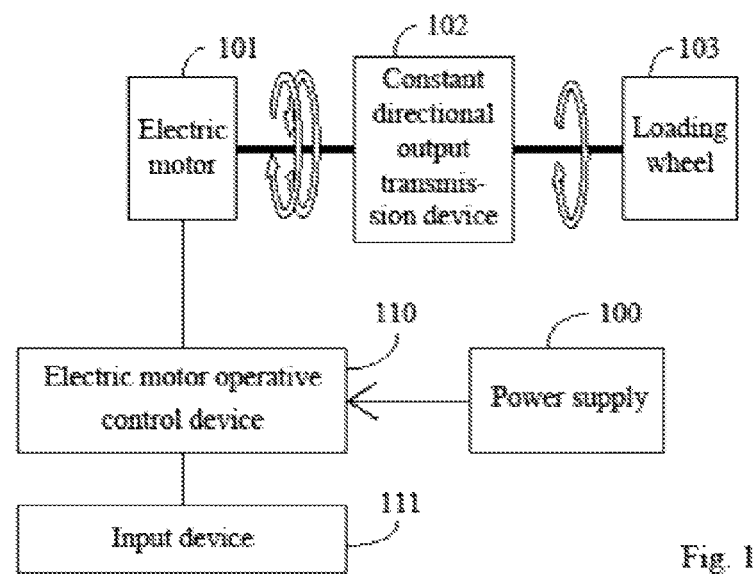
FIG. 1 is a basic block schematic view of the electric motor drive system of the present invention with bi-directional input and constant directional output.

100: Power supply device
101: Electric motor
102: Constant directional output transmission device
103: Loading wheel train
104, 200: Transmission device
109: Electric motor loading currents detection device
110: Electric motor operative control device
111: Input device

DETAILED DESCRIPTION OF THE PREFERRED EMBODIMENTS

The present invention discloses a drive system being able to do bi-directional rotation of positive or reverse rotation by electric motor for driving input end of the constant directional output transmission device and further through the output end of the constant directional output transmission device to provide constant directional rotation output of different speed change ratio in different directions of driving inputs via the constant directional output transmission device of different speed change ratio for driving the loading wheel trains, wherein the present invention can be applied in electric motor driven carriers such as electric bicycles, electric motorcycles, electric vehicles, or electric driven industry machinery.

FIG. 1 is a basic block schematic view of the electric motor drive system of the present invention with bi-directional input and constant directional output.

Figure 2:
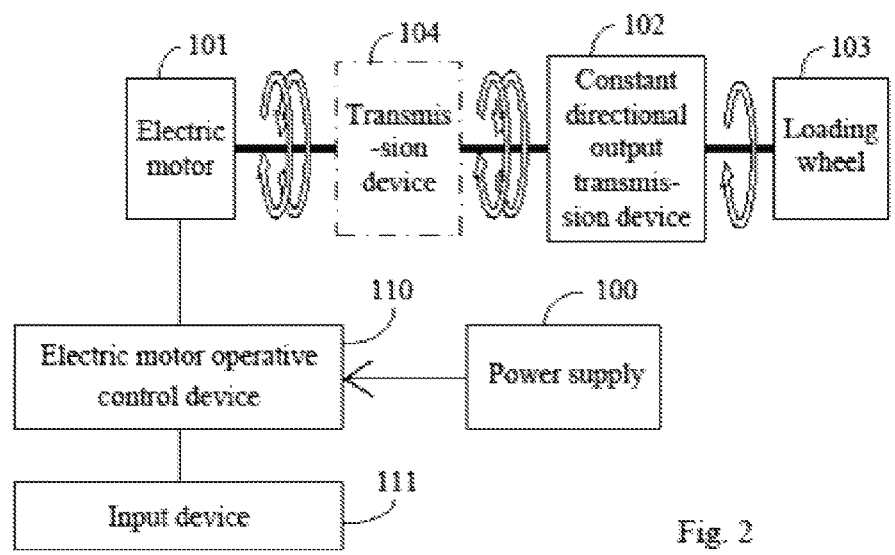
FIG. 2 is a block schematic view showing that the drive system in FIG. 1 is additionally installed with a transmission device (104) between the electric motor (101) and the constant directional output transmission device (102).

FIG. 2 is a block schematic view showing that the drive system in FIG. 1 is additionally installed with a transmission device (104) between the electric motor (101) and the constant directional output transmission device (102).

Figure 3:
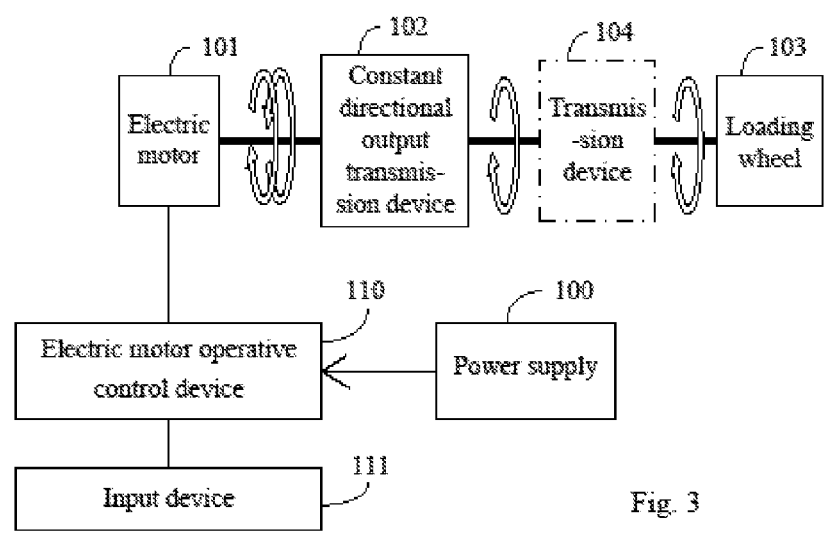
FIG. 3 is a block schematic view showing that the drive system in FIG. 1 is additionally installed with a transmission device (104) between the constant directional output transmission device (102) and the driven loading wheel (103), referred to hereinafter as loading wheel train (103).

FIG. 3 is a block schematic view showing that the drive system in FIG. 1 is additionally installed with a transmission device (104) between the constant directional output transmission device (102) and the driven loading wheel train (103).

Figure 4:
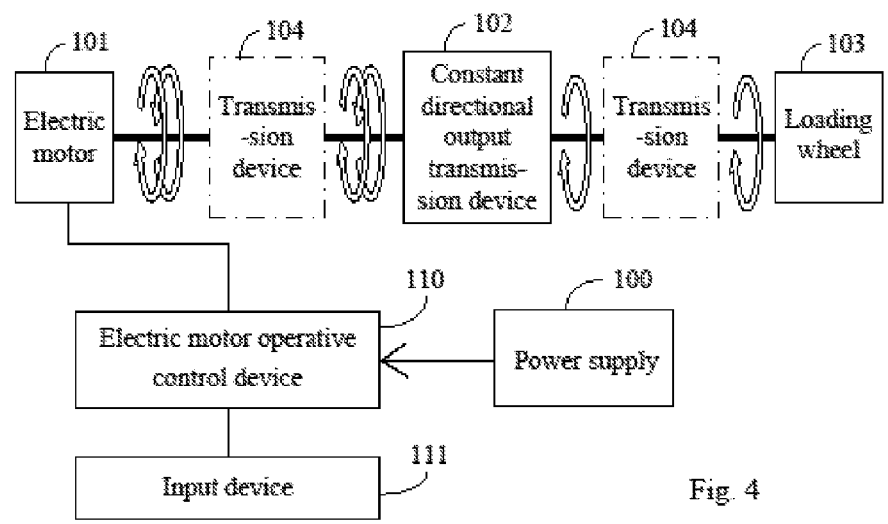
FIG. 4 is a block schematic view showing that the drive system in FIG. 1 is additionally installed with a transmission device (104) between the electric motor (101) and the constant directional output transmission device (102) as well as between the constant directional output transmission device (102) and the driven loading wheel train (103).

FIG. 4 is a block schematic view showing that the drive system in FIG. 1 is additionally installed with a transmission device (104) between the electric motor (101) and the constant directional output transmission device (102) as well as between the constant directional output transmission device (102) and the driven loading wheel train (103).

As shown in the FIGS. 1~4, for the electric motor drive system with bi-directional input and constant directional output, the electric power from the power supply (100), hereinafter referred to as power supply device (100), is subject to the operative signal or commands of the input device (111) via the electric motor operative control device (110) to drive the electric motor (101) in the first driven rotational direction or in the second driven rotational direction of contrary rotational direction, wherein the rotational kinetic energy output from the output end of the electric motor (101) is directly or through the transmission device (104) provided to the input end of the constant directional output transmission device (102), thereby by means of the constant directional output transmission device of different speed change ratio to output the rotational kinetic energy in constant rotational direction of different speed change ratio in different directions of driving inputs, and further to drive the loading wheel train (103) as shown in FIG. 1~FIG. 4, wherein:

The electric motor (101): It is comprised of AC or DC, brushless or brushed, synchronous or asynchronous operated electric power driven electric motor, and can be operated in both positive direction and reverse direction;

Electric motor operative control device (110): it is constituted by dynamo-electric components or devices, or solid state electronic components or device, or the control circuits having microprocessor and associate operative software for inputting AC or DC power from the utility power source or the generator, or inputting electric power from the power supply device (100) such as fuel battery, primary battery, or charge/discharge secondary battery, thereby to operatively control the on/off, rotational direction, rotational speed, torque to the electric motor (101), or provide over-voltage or over-currents protection to the electric motor (101);

Input device (111): it issues signals or commands to the electric motor operative control device (110) for operatively controlling or setting the on/off, rotational direction, rotational speed, torque to the electric motor (101);

The input kinetic energy of the first driven rotational direction and the second driven rotational direction from the electric motor (101) is for driving the input end of the constant directional output transmission device (102);

The first driven rotational direction is contrary to the second driven rotational direction;

The constant directional output transmission device (102): The constant directional output transmission device (102) directly receives or is through the transmission device (104) to receive kinetic energy in different rotational direction from the electric motor (101) so as to provide kinetic energy output in constant rotational direction; wherein the internal transmission components of the constant directional output transmission device (102) are constituted by one or more than one transmission components of the 1) gear train; or 2) friction wheel train; or 3) chain and chain sprocket train; or 4) belt and belt wheel train; or 5) transmission crankshaft and wheel train; or 6) fluid transmission device; or 7) electromagnetic transmission device, etc., wherein if the constant directional output transmission device (102) is driven by the inputs of the first driven rotational direction and the second driven rotational direction in different rotational directions, the speed ratio of the constant directional rotation between the one at the input end and the one at the output end is different or a variable speed ratio;

The loading wheel train (103): It is the wheel train type load being directly driven by the constant directional output transmission device (102) or being driven in the single constant directional rotation via the transmission device (104).

The electric motor drive system with bi-directional input and constant directional output of the present invention can be further installed with a transmission device between the constant directional output transmission device (102) and the loading wheel train (103), or between the electric motor (101) and the constant directional output transmission device (102), or between the electric motor (101) and the constant directional output transmission device (102) as well as between the constant directional output transmission device (102) and the loading wheel train (103);

FIG. 2 is a block schematic view showing that the drive system in FIG. 1 is additionally installed with a transmission device (104) between the electric motor (101) and the constant directional output transmission device (102).

FIG. 3 is a block schematic view showing that the drive system in FIG. 1 is additionally installed with a transmission device (104) between the constant directional output transmission device (102) and the driven loading wheel train (103).

FIG. 4 is a block schematic view showing that the drive system in FIG. 1 is additionally installed with a transmission device (104) between the electric motor (101) and the constant directional output transmission device (102) as well as between the constant directional output transmission device (102) and the driven loading wheel train (103).

The transmission device (104): The transmission device (104) is constituted by one or more than one transmission devices of the following: 1) various gear-type, belt-type, friction-type fixed speed ratio rotating type transmission functioning structure, or 2) a stepped or stepless variable speed device being operated manually, or by the mechanical force, or fluid force, or centrifugal force, or rotating torque or counter-rotating torque, or 3) the transmission device of the capability to operatively control the switching relationship of the relative rotating directions at the input end and output end, or 4) the clutch device or the single way clutch being operated manually, or by the mechanical force, or electromagnetic force, or fluid force, or centrifugal force, or rotating torque, or counter-rotating torque for connecting transmission or interrupting transmission clutch functioning structure.

For the electric motor drive system with bi-directional input and constant directional output of the present invention, the input device (111) is manually operated to through the electric motor operative control device (110) operatively control the rotational direction of the electric motor (101).

Figure 5:
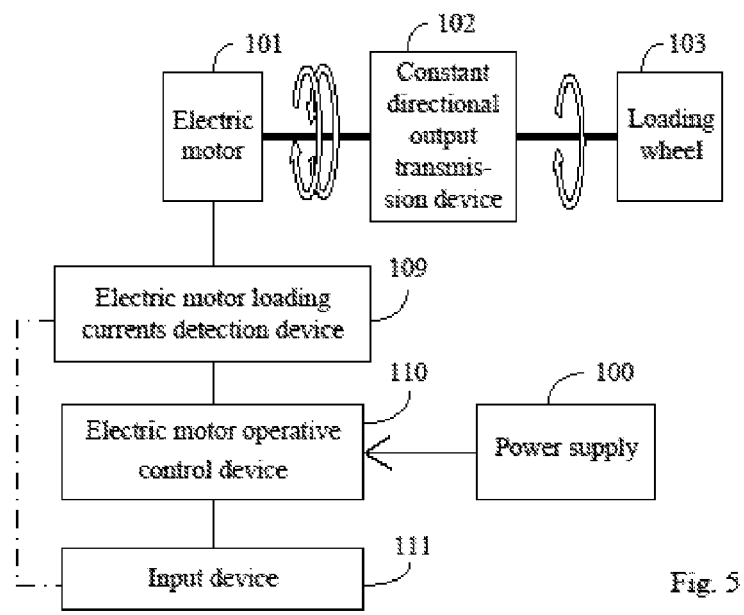
FIG. 5 is a basic block schematic view of the electric motor drive system with bi-directional input and constant directional output of the present invention being installed with an electric motor loading currents detection device.

In addition, the electric motor drive system with bi-directional input and constant directional output of the present invention can be additional installed with an electric motor loading currents detection device (109), thereby to automatically switch the output speed ratio according to the loading currents;

FIG. 5 is a basic block schematic view of the electric motor drive system with bi-directional input and constant directional output of the present invention being installed with an electric motor loading currents detection device.

Figure 6:
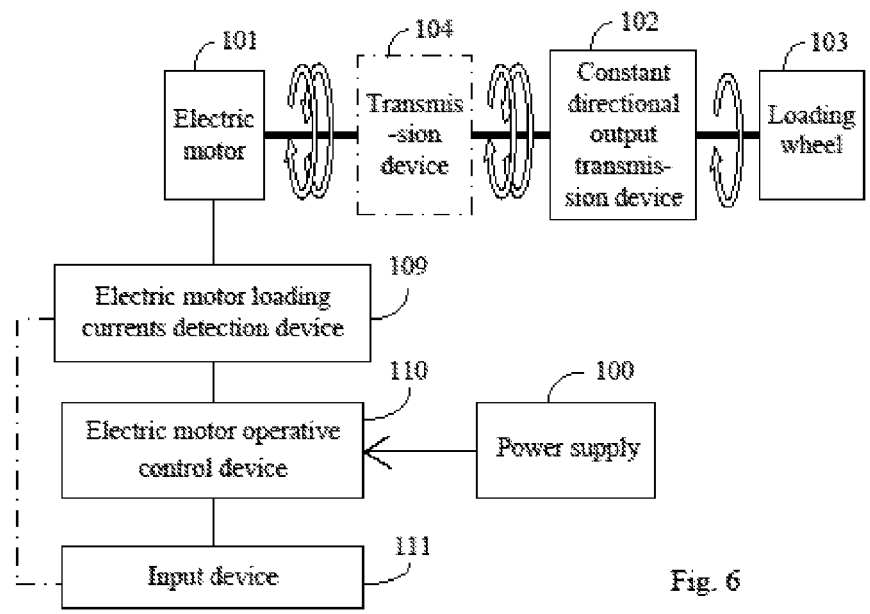
FIG. 6 is a block schematic view showing that the drive system in FIG. 5 is additionally installed with a transmission device (104) between the electric motor (101) and the constant directional output transmission device (102).

FIG. 6 is a block schematic view showing that the drive system in FIG. 5 is additionally installed with a transmission device (104) between the electric motor (101) and the constant directional output transmission device (102).

Figure 7:
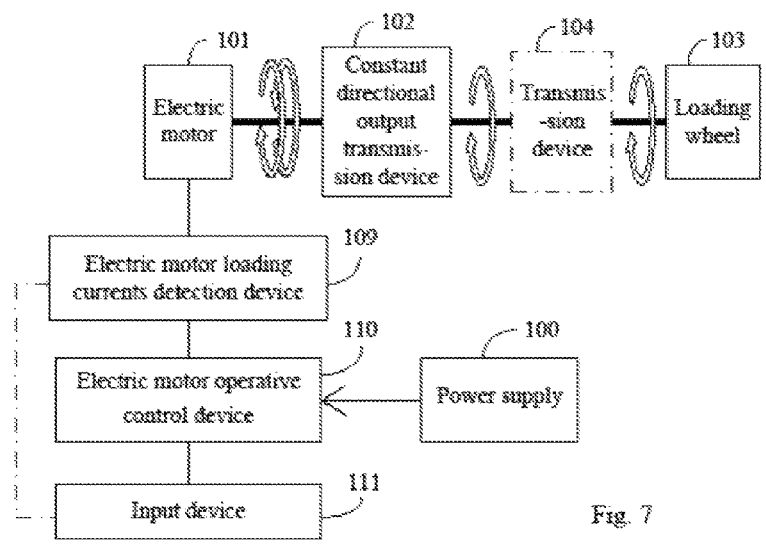
FIG. 7 is a block schematic view showing that the drive system in FIG. 5 is additionally installed with a transmission device (104) between the constant directional output transmission device (102) and the driven loading wheel train (103).

FIG. 7 is a block schematic view showing that the drive system in FIG. 5 is additionally installed with a transmission device (104) between the constant directional output transmission device (102) and the driven loading wheel train (103).

Figure 8:
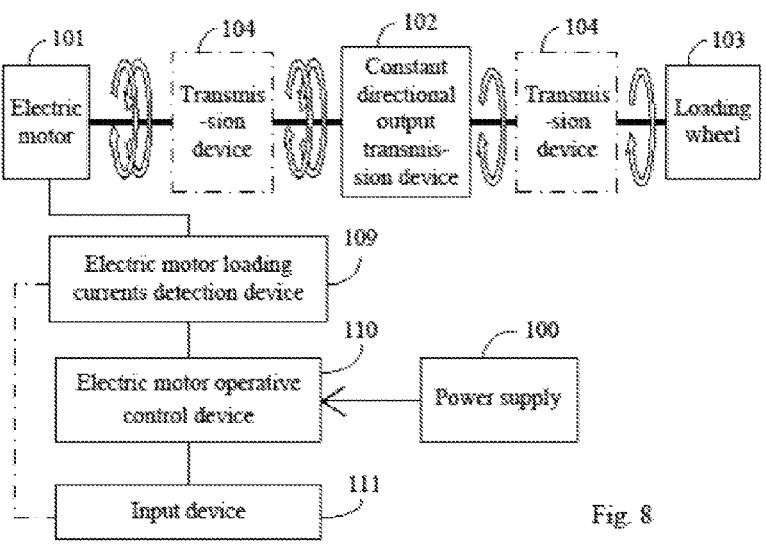
FIG. 8 is a block schematic view showing that the drive system in FIG. 5 is additionally installed with a transmission device (104) between the electric motor (101) and the constant directional output transmission device (102) as well as between the constant directional output transmission device (102) and the driven loading wheel train (103).

FIG. 8 is a block schematic view showing that the drive system in FIG. 5 is additionally installed with a transmission device (104) between the electric motor (101) and the constant directional output transmission device (102) as well as between the constant directional output transmission device (102) and the driven loading wheel train (103).

As shown in aforementioned FIGS. 5~8, the electric motor drive system with bi-directional input and constant directional output of the present invention is further installed with an electric motor loading currents detection device (109), wherein the electric motor loading currents detection device (109) can be comprised of various buck/step down type current detection device, or electromagnetic effect induction type current detection device, or magnetic detecting type current detection device, or heat accumulated type current detection device for detecting loading currents of the electric motor (101), thereby feedback to the electric motor operative control device (110), wherein when the loading currents of the electric motor exceeds the predetermined value and the status exceeds the preset time, the signals from the electric motor loading currents detection device (109) is transmitted to the input device (111) or the electric motor operative control device (110) so as to change the rotational direction of the electric motor (101) and further change the speed ratio of the constant directional output transmission device (102) to a relatively enlarged deduction ratio to increase the output in the same rotational direction of the output rotational torque to further drive the load.

When the loading currents of the electric motor (101) return and drop below the predetermined value, the following two methods can be operated to make the electric motor back to the normal status, including:

1) By manually control the input device (111) to operatively control the electric motor operative control device (110) to enable the electric motor (101) returning to the original rotational direction, thereby driving the load at original speed ratio; or 2) When the electric motor loading currents detection device (109) detects currents dropping to the predetermined value, by means of the electric motor operative control device (110) to automatically select the rotational speed which is not only capable of driving the load at that time, but also capable of outputting corresponding power volume according to the variation of the speed ratio so as to drive the load fluently without pauses or unexpected accelerations, thereby to drive the electric motor (101) being fluently operated in the original rotational direction.

If the electric motor drive system with bi-directional input and constant directional output of the present invention further requires to perform constant directional output in different driving directions, it can be achieved by one of following methods:

1) By means of the electric motor operative control device (110) to operatively control the initial driving direction of the electric motor (101); or 2) A motor direction switch is additionally installed to manually switch the initial rotational direction of the motor; or 3) One of the transmission devices (104) is constituted by the transmission device with functions of mechanically switching rotational directions of the output and changing the speed ratio for switching the rotational direction of output.

The invention claimed is:

1. An electric motor drive system with a constant directional output transmission device, comprising:

a bi-directional electric motor arranged to be driven in a forward direction and a reverse direction, wherein said electric motor directly or indirectly drives an input of the constant directional output transmission device;

an electric motor control device for controlling at least a rotational direction and a speed or torque of the electric motor;

an input device for issuing signals or commands to the electric motor control device to control said rotational direction and speed or torque; and at least a load wheel directly or indirectly driven in a constant direction by said constant directional output transmission device, and a current-detecting device for detecting a load current of the electric motor by detecting a voltage, electromagnetic induction, a magnetic field, or heat accumulation, said electric motor load current detecting device providing feedback to the electric motor control device, wherein a speed ratio of the constant directional output transmission device depends, at least in part, on a rotational direction of the electric motor, wherein when a load current of the electric motor exceeds a predetermined value for a predetermined time, the electric motor control device changes a rotational direction of said electric motor output to a rotating direction that provides an increased electric motor output speed and increased rotating speed or torque to said power input of said load, and wherein when the load current falls below said predetermined value, said electric motor is either manually controlled through the input device, or automatically controlled through the electric motor operative control device, to return to a normal status, including the original rotational direction and output power, to thereby enable the electric motor to be smoothly operated in the original rotational direction.

2. An electric motor device system as claimed in claim 1, wherein said electric motor is directly connected to the input of the constant directional output transmission device.

3. An electric motor device system as claimed in claim 1, wherein said electric motor indirectly drives said constant directional output transmission device through a second transmission device.

4. An electric motor device system as claimed in claim 1, wherein said constant directional output transmission device is directly connected to said load wheel.

5. An electric motor device system as claimed in claim 1, wherein said constant directional output transmission device indirectly drives said load wheel through a second transmission device.

6. An electric motor device system as claimed in claim 1, wherein said electric motor indirectly drives said constant directional output transmission device through a second transmission device, and said constant directional output transmission device indirectly drives said load wheel through a third transmission device.

7. An electric motor device system as claimed in claim 3, wherein the second transmission device at least one of: (a) a gear-type, belt-type, or friction-type fixed speed ratio rotating transmission structure; and (b) a variable speed device operated manually, by mechanical, fluid, electromagnetic, or centrifugal force, or by rotating or counter rotating torque.

8. An electric motor device system as claimed in claim 3, wherein the second transmission device is arranged to operatively control a switching relationship of relative rotating directions at input and output ends of the second transmission device.

9. An electric motor device system as claimed in claim 3, wherein the second transmission device includes a clutch operated manually, by mechanical, fluid, electromagnetic, or centrifugal force, or by rotating or counter rotating torque, for enabling or interrupting transmission of kinetic energy between the electric motor and the constant directional output transmission device.

10. An electric motor device system as claimed in claim 5, wherein the second transmission device at least one of: (a) a gear-type, belt-type, or friction-type fixed speed ratio rotating transmission structure; and (b) a variable speed device operated manually, by mechanical, fluid, electromagnetic, or centrifugal force, or by rotating or counter rotating torque.

11. An electric motor device system as claimed in claim 5, wherein the second transmission device is arranged to operatively control a switching relationship of relative rotating directions at input and output ends of the second transmission device.

12. An electric motor device system as claimed in claim 5, wherein the second transmission device includes a clutch operated manually, by mechanical, fluid, electromagnetic, or centrifugal force, or by rotating or counter rotating torque, for enabling or interrupting transmission of kinetic energy between the constant directional output transmission device and the load wheel.

13. An electric motor device system as claimed in claim 1, wherein when the electric motor current detection device detects that the load current of the electric motor has returned to below the predetermined value, the electric motor control device automatically selects the rotational speed of the electric motor in an original rotating direction that not only drives the load but that also outputs sufficient power according to the speed ratio variation of the constant directional output transmission device to drive the load wheel smoothly without pauses or unexpected acceleration.

14. An electric motor device system as claimed in claim 1, wherein the electric motor control device controls an initial rotational direction of the electric motor.

15. An electric motor device system as claimed in claim 1, further comprising a second transmission device for mechanically switching a rotational direction of an output of the electric motor.

16. An electric motor device system as claimed in claim 1, wherein the electric motor is at least one of an AC motor, a DC motor, a synchronously operated electric motor, and an asynchronous electric motor.

17. An electric motor device system as claimed in claim 1, wherein said constant directional output transmission device includes at least one of a gear train, a friction wheel train, a chain and sprocket train, a belt and pulley, a transmission crankshaft and wheel train, a fluid transmission device, and an electromagnetic transmission device.

* * * * *